US012005469B2

(12) United States Patent
Iida

(10) Patent No.: US 12,005,469 B2
(45) Date of Patent: Jun. 11, 2024

(54) COATING DETERMINATION DEVICE OF COATING HEAD AND COATING SYSTEM

(71) Applicant: ABB Schweiz AG, Baden (CH)

(72) Inventor: Kisumi Iida, Tokyo (JP)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/807,729

(22) Filed: Jun. 19, 2022

(65) Prior Publication Data
US 2023/0008500 A1 Jan. 12, 2023

(30) Foreign Application Priority Data

Jul. 8, 2021 (JP) .................................. 2021-113474
Dec. 16, 2021 (JP) .................................. 2021-204338

(51) Int. Cl.
*B05C 11/00* (2006.01)
*B05B 15/50* (2018.01)
(Continued)

(52) U.S. Cl.
CPC ................ *B05C 11/00* (2013.01); *B05C 5/02* (2013.01); *G06T 7/0004* (2013.01);
(Continued)

(58) Field of Classification Search
USPC ........ 118/313, 315, 665, 679–682, 623, 621, 118/712, 713, 302
See application file for complete search history.

(56) References Cited

U.S. PATENT DOCUMENTS 4,919,074 A * 4/1990 Kurihara ............ H05K 13/0469
118/313
7,182,815 B2 * 2/2007 Katagami .............. G02B 5/201
347/42
(Continued)

FOREIGN PATENT DOCUMENTS

EP 2394745 A1 12/2011
EP 3055680 B1 4/2020
(Continued)

OTHER PUBLICATIONS

Japan Notice of Reasons for Refusal, issued by the Japan Patent Office, regarding corresponding patent application Serial No. 2021-113474; Sep. 30, 2021; 10 pages (with English translation).
(Continued)

*Primary Examiner* — Yewebdar T Tadesse
(74) *Attorney, Agent, or Firm* — Greenberg Traurig, LLP

(57) ABSTRACT

According to the present disclosure, there is provided a coating determining device of a coating head that can prevent coating defect caused by clogging in multiple successive coatings. The coating determining device according to the present disclosure can determine a coating state of the coating head, wherein the coating head having a plurality of nozzles for ejecting paint, the plurality of nozzles being configured to eject the paint out of the nozzles so as to coat a workpiece with the ejected paint while moving in a direction, the coating determining device of the coating head being characterized by comprising: an image acquiring unit for acquiring an image of the coated workpiece; and a determination unit for determining, based on the image acquired by the image acquiring unit, whether coating the workpiece is implemented normally.

15 Claims, 8 Drawing Sheets

(51) Int. Cl.
*B05C 5/02* (2006.01)
*G06T 7/00* (2017.01)
*H04N 13/204* (2018.01)

(52) U.S. Cl.
CPC ............ *G06T 2200/04* (2013.01); *G06T 2207/10012* (2013.01); *G06T 2207/30156* (2013.01); *G06T 2207/30164* (2013.01); *H04N 13/204* (2018.05)

(56) References Cited

U.S. PATENT DOCUMENTS

| | | | |
|---|---|---|---|
| 2004/0246298 A1* | 12/2004 | Ito | G02B 5/201 118/313 |
| 2018/0283019 A1* | 10/2018 | Telleria | B24B 55/06 |
| 2018/0297113 A1* | 10/2018 | Preston | B22F 10/16 |
| 2019/0001664 A1* | 1/2019 | Yamazaki | B41J 11/0095 |
| 2019/0091712 A1 | 3/2019 | Medard et al. | |
| 2020/0298571 A1* | 9/2020 | Honda | B41J 2/2142 |
| 2021/0086503 A1 | 3/2021 | Aoyagi et al. | |
| 2022/0161324 A1* | 5/2022 | Matsuda | B23K 26/342 |

FOREIGN PATENT DOCUMENTS

| | | |
|---|---|---|
| JP | 2008229444 A | 10/2008 |
| JP | 2010227762 A | 10/2010 |
| JP | 2010231211 A | 10/2010 |
| JP | 2012-121001 A | 6/2012 |
| JP | 2013059720 A | 4/2013 |
| JP | 2013208838 A * | 10/2013 |
| JP | 6512965 B2 | 5/2019 |
| JP | 2020024943 A | 2/2020 |
| WO | 2008093701 A1 | 8/2008 |
| WO | 2010090080 A1 | 8/2010 |
| WO | 2020115117 A1 | 6/2020 |

OTHER PUBLICATIONS

Decision to Grant a Patent, issued by the Japan Patent Office, regarding corresponding patent application Serial No. 2021-113474; dated Feb. 25, 2022; 6 pages (with English translation).

Decision to Grant a Patent, issued by the Japan Patent Office, regarding corresponding patent application Serial No. 2021-204338; dated Jul. 29, 2022; 6 pages (with English translation).

* cited by examiner

COATING DETERMINATION DEVICE OF COATING HEAD AND COATING SYSTEM

CROSS-REFERENCE TO RELATED APPLICATIONS

This application claims priority to Japan patent application Serial No.: JP 2021-204338, filed on Jan. 20, 2022; which is a divisional patent application of and claims priority to Japan patent application Serial No.: JP 2021-113474, filed on Jul. 8, 2021; and which are herein incorporated by reference in their entireties

FIELD

Embodiments of the present disclosure generally relate to a coating determining device of a coating head and a coating system.

BACKGROUND

A typical technique of performing exterior coating has been provided, involving using a coating device including a coating head having a plurality of nozzles for ejecting paint. For example, in a production plant of an automobile, a technique has been proposed in which a coating device composed of a multi joint robot having the above-mentioned coating head disposed at the front end is installed in a coating line to coat a vehicle body. In the coating process by the coating head, since a coating material having a viscosity different from that of the ink used for printing on a paper surface is used, clogging of the nozzles due to adhesion of coating residues probably occur in the nozzles.

Therefore, there is provided a technique that includes detecting the state of the coating agent or the paint droplets ejected from the coating device and cleaning each nozzle of the coating head before clearing the clogging (see Patent Document 1). In Patent Document 1, a light source for emitting inspection light and a camera disposed in a cleaning device for capturing droplets irradiated by the light source, where the image captured by the camera is used to evaluate the number of droplets, the ejection angle of droplets, and whether the ejection direction of the droplets ejected from each nozzle is closed, to detect whether there is clogging.

PRIOR ART DOCUMENT

Patent Document

Patent Document 1: WO 2020/115117

SUMMARY

Problem to be Solved by the Present Disclosure

The cleaning device disclosed in Patent Document 1 has an advantage that detection of the presence or absence of clogging and nozzle cleaning can be performed using a single device. However, according to Patent Document 1, detecting clogging, a degree of clogging and the like, is performed for the purpose of nozzle cleaning when the paint color is changed or during the period of stopping coating, rather than detecting clogging and a degree of clogging occurring during the coating process. Therefore, in Patent Document 1, it is impossible to detect the presence or absence of clogging that has occurred in multiple successive coatings, i.e., it cannot be detected whether coating defect has occurred.

The present disclosure is proposed for solving the above problem, with the objective to provide a technique that can prevent coating defect caused by clogging in multiple successive coatings.

Means for Solving the Problem

In order to solve the above problem, an example of the coating determining device of the coating head according to the present disclosure, where the coating head having a plurality of nozzles for ejecting paint, the plurality of nozzles being configured to eject the paint out of the nozzles so as to coat a workpiece with the ejected paint while moving in a direction, the coating determining device of the coating head comprising: an image acquiring unit for acquiring an image of the coated workpiece; and a determination unit for determining, based on the image acquired by the image acquiring unit, whether coating the workpiece is implemented normally.

The coating determining device further comprises: an extraction unit for extracting coating defect in the workpiece from the image of the coated workpiece, wherein when the extraction unit determines that the coating defect in the workpiece, the determination unit determines the nozzles in which the ejecting defect occurs from the plurality of nozzles comprised by the coating head.

In addition, the coating head comprises a control unit for controlling ejection of the paint of the plurality of nozzles for the nozzle, the control unit cooperates with the coating head to move in a direction, and applies to the workpiece with a pattern for determination for determining whether there is a ejecting defect for the paint, using the plurality of nozzles comprised by the coating head, and the determining unit determines, based on an image of the workpiece coated with the pattern for determination, whether coating the workpiece is implemented normally.

In the case, the coating head is provided with a plurality of nozzle rows in a direction orthogonal to the direction, the nozzle rows each including a predetermined number of nozzles arranged in a direction inclined relative to the direction, the pattern for determination at least comprises a plurality of baselines configured in a 2-dimensional shape and extending along the direction, and when the coating head is moving in a direction, the control unit, while switching the nozzles, coats the plurality of baselines onto the workpiece by continuously ejecting the paint baselines from any one of the predetermined number of nozzles comprised by each of the plurality of nozzle rows.

In the image of the pattern for determination acquired by the image acquiring unit, for the baselines formed using any one from the predetermined number of nozzles comprised by a same nozzle row, when the coating defect occurs in more than a predetermined number of baselines, the determination unit determines that coating the workpiece is not implemented normally using the coating head.

The coating determining device further comprises: at least one camera unit for capturing an image of the workpiece at a plurality of different positions; a 3-dimensional image generating unit for generating, using the image acquired by the at least one camera unit, a 3-dimensional image of the workpiece coated by the coating head; and a state determining unit for determining, using the 3-dimensional image of the workpiece generated by the 3-dimensional image generating unit, a coated state of the workpiece.

The coating determining device further comprises: an instruction unit for instructing to apply the pattern for determination for determining presence or absence of a in ejecting defect for the paint when the state determining unit determines that the thickness of the paint is below the predetermined thickness, wherein the state determining unit determines, using the 3-dimensional image, whether a thickness of the paint coated over the workpiece is below a predetermined thickness.

A coating system according to the present disclosure comprises: a coating head comprising a plurality of nozzles; a moving unit disposed within a coating chamber subjected to an explosion-proof treatment and configured to move the coating head along a workpiece in a direction; the coating determining device of the coating head; and a cleaning unit for cleaning the plurality of nozzles comprised by the coating head, wherein when the coating determining device of the coating head determines that coating the workpiece is not implemented normally, the cleaning unit cleans the plurality of nozzles comprised by the coating head.

The workpiece comprises a first workpiece for determining whether coating the workpiece is implemented normally in the coating determining device of the coating head, the coating determining device of the coating head is disposed outside the coating chamber, and the coating system further comprises a transport unit for transporting the first workpiece coated by the coating head to the coating determining device of the coating head.

Invention Effect

According to the present disclosure, coating defect caused by clogging in multiple successive coatings can be avoided.

REFERENCE SIGNS

Figure 1:
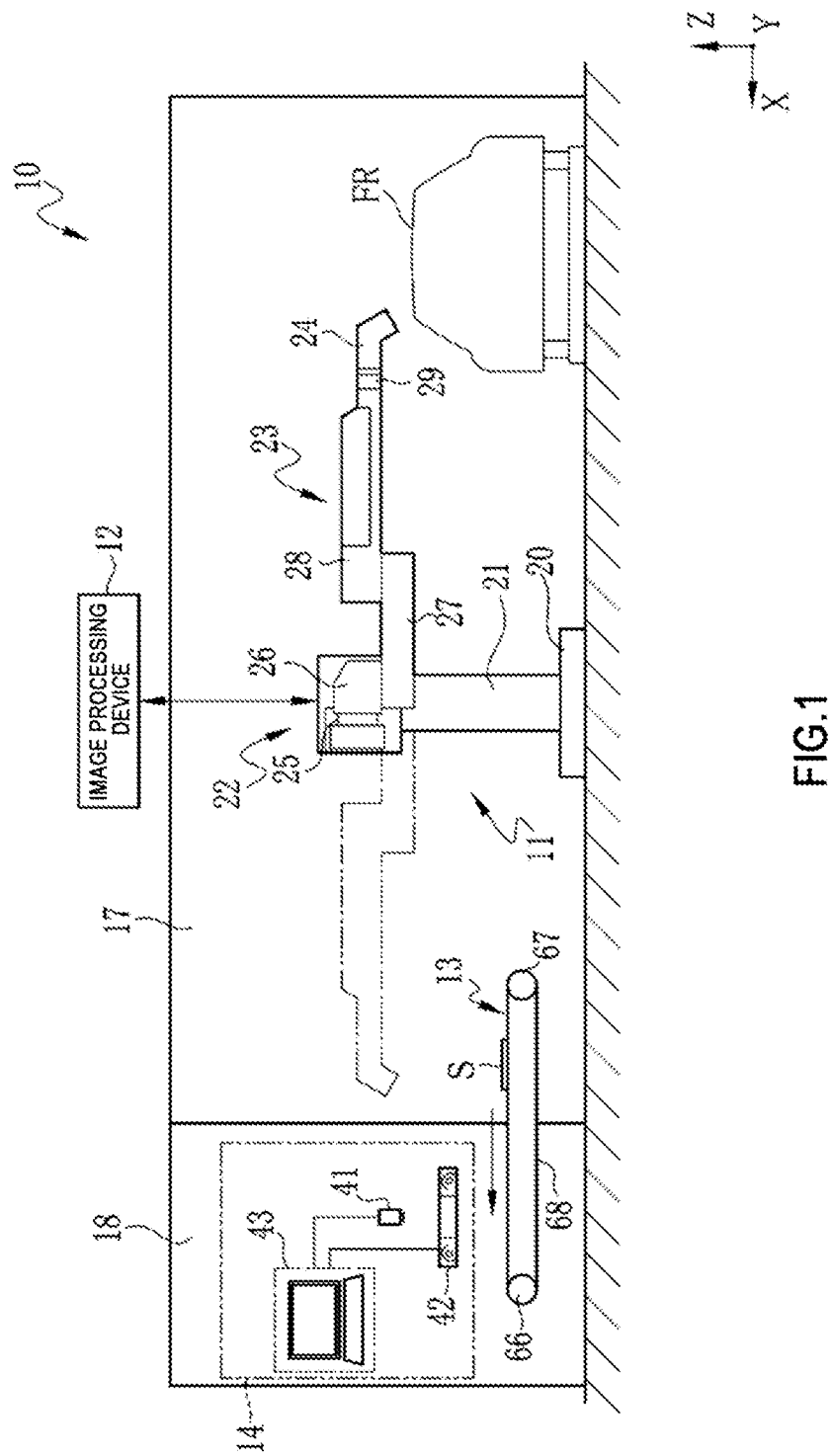
FIG. 1 is a diagram illustrating an example of a coating system for implementing the present disclosure.

10 coating system
11 coating robot
12 image processing device
13 transport device
14 coating determining device
24 coating head unit
30 coating head
31 nozzle forming surface
32a, 32b nozzle group
33 nozzle
34a, 34b nozzle row
41 camera section
42 light source
43 computer
FR vehicle body
S sample
TP test pattern

DETAILED DESCRIPTION OF EMBODIMENTS

References now are made to the drawings to illustrate a coating system for carrying out the present disclosure. As illustrated in FIG. 1, the coating system 10 includes a coating robot 11, an image processing device 12, a transport device 13 and a coating determining device 14. It is to be noted that the coating robot 11 in the coating system 10 is disposed within a coating chamber 17 subjected to an explosion-proof treatment, and the image processing device 12 is disposed outside the coating chamber 17. In addition, the coating determining device 14 is disposed within an inspection chamber 18 adjacent to the coating chamber 17. The transport device 13 is disposed across the coating chamber 17 and the inspection chamber 18.

Although omitted in the drawings, the object to be coated is transported from the upstream of the coating line to the inside of the coating chamber 17. The object to be coated is subjected to coating while being transported into the coating chamber 17 or temporarily stopped when transported to a predetermined position in the coating chamber 17. When the object to be coated has been subjected to coating, it is indicated that the object to be coated is transported from the coating chamber 17 to the downstream of the coating line. Hereinafter, the vehicle body FR of the automobile will be described as an example of the object to be coated, but the object to be coated may be, for example, an automobile part other than the vehicle body (as one example, a door, a hood, various panels, and the like, but the present invention is not limited thereto), and other parts (as an example, an airplane or a railway exterior part) other than the automobile, and the like, there is no need to be limited to the vehicle body of the automobile.

Moreover, in the following description, a coating system 10 for coating a vehicle body FR by using one coating robot 11 will be described, but coating system 10 may be a coating system for coating a vehicle body FR using two or more coating machines 11.

The objective of coating is to form a coating film on a surface of an object to be coated to protect the surface thereof and attain a pleasant appearance. To this end, in addition to coating an object to be coated using paint of a specific color or a paint having a specific function, coating includes coating an object to be coated by using paint of multiple colors in order. Furthermore, the coating includes, for example, coating such as a pattern, an illustration, an image or the like.

For example, the coating robot 11 includes a substrate 20, a leg 21, a rotatable drive unit 22, a mechanical arm 23 and a coating head unit 24. The substrate 20 is a member that holds an underside of the leg 21 extending in the vertical direction and supports the entire coating robot 11. The substrate 20 can be fixed on, for example, the floor surface of the coating chamber 17, or may be movable within the coating chamber 17. It would be appreciated that the coating robot 11 is rotatable between a position (denoted by a solid line in FIG. 1) of the coating robot 11 for coating the vehicle body FR transported in the coating line and a position (denoted by a double-dotted line in FIG. 1) of the coating robot 11 for coating a sample S with a test pattern TP (referring to FIG. 3(*a*)), with the leg 21 being the rotation center. The vehicle body FR and the sample S here is equivalent to the workpiece as recited in the technical solution.

A rotatable drive unit 22 is disposed at an upper end of the leg 21. The rotatable drive unit 22 includes a rotatable shaft unit 25 and a rotatable arm 26. The rotatable shaft unit 25 causes the mechanical arm 23 linked via the rotatable arm 26 to rotate around a straight line included in a plane (an XY plane in FIG. 1) parallel to the ground as a rotation center. The rotatable arm 26 is disposed between the rotatable shaft unit 25 and the mechanical arm 23. When driven by a motor M1 (see FIG. 5), the rotatable arm 26 rotates with the central axis of the rotary shaft of the motor M1 (i.e., the central axis of the rotatable shaft unit 25) as a rotation center. Examples of the motor M1 can include an electric motor or a pneumatic motor.

The mechanism arm 23 includes a first rotatable arm 27 and a second rotatable arm 28. The first rotatable arm 27 is linked to the rotatable arm 26 via a shaft section not shown in the figure at an end in the extending direction of the first rotatable arm 27 (e.g. the X-axis direction in FIG. 1), and driven via a motor M2 (see FIG. 5) to rotate around the center axis of the shaft section, which acts as a rotation center. It is worth noting that, although not shown in detail in the figure, the motor M2 is housed within the housing of the rotatable arm 26 or the housing of the first rotatable arm 27.

The second rotatable arm 28 is linked to the first rotatable arm 27 via the shaft section not shown in the figure at the other end in the extending direction of the first rotatable arm 27 (e.g. the X-axis direction in FIG. 1), and driven via a motor M3 (see FIG. 5) to rotate around the central axis of the shaft unit, which acts as a rotation center. It is worth noting that, although not shown in the figure, the motor M3 is housed within the housing of the first rotatable arm 27 or the housing of the second rotatable arm 28.

The second rotatable arm 28 holds a wrist 29 at the other end opposite the end linked to the first rotatable arm 27. In a state of retaining the coating head unit 27, the wrist 29 causes the retained coating head unit 24 to rotate around a certain shaft section among a plurality of shaft sections included therein, which acts as a rotation center. For example, the pluralities of shaft sections are 3 shaft sections in different directions. It is worth noting that the number of shaft section can be two or more.

Figure 5:
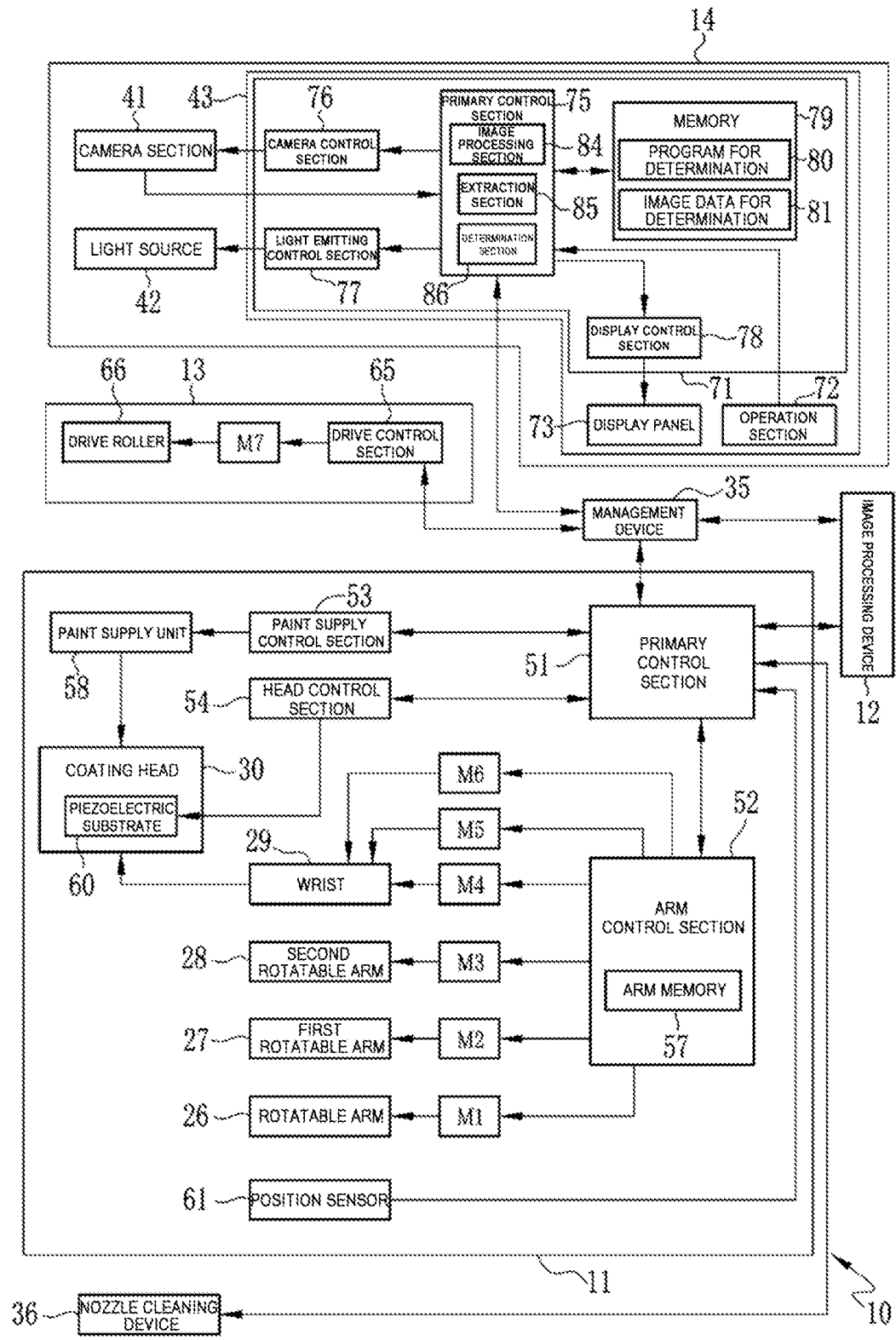
FIG. 5 is a diagram illustrating a control composition in a coating system.

The wrist 29 includes motors M4, M5 and M6 (see FIG. 5). When driven by a any one of those motors, the wrist 29 enables rotational motion around the shaft section corresponding to the motor to be driven among the plurality of shaft sections, which acts as the rotation center.

The coating head 24 includes a head control unit 54 and the like. The head control unit 54 controls a coating head 30, a circular path for circulating paint (not shown in the figure), and a piezoelectric substrate 60 (see FIG. 5) included in the coating head 30.

Figure 2:
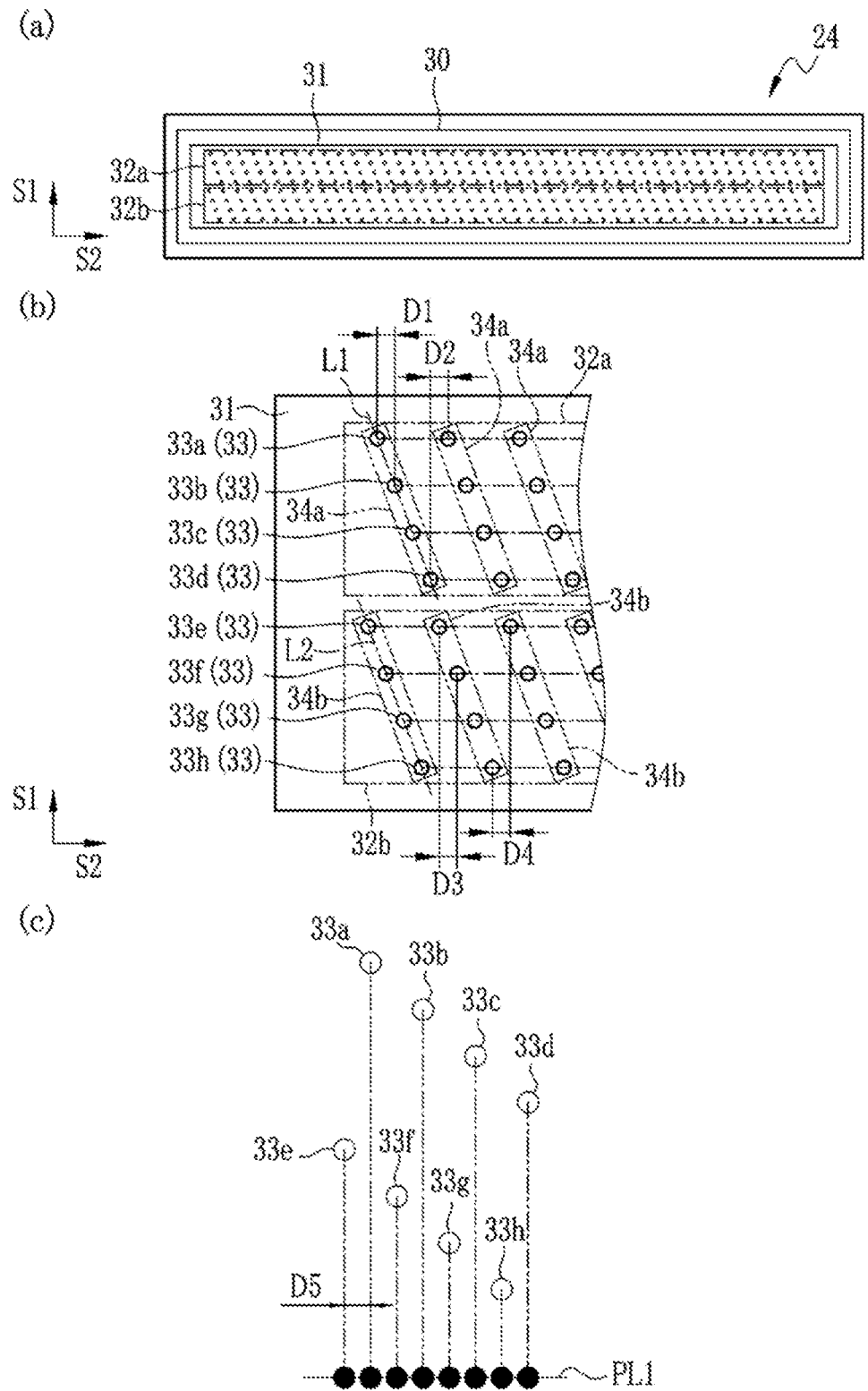
In FIG. 2, (a) is a diagram illustrating an example of a configuration of nozzles disposed on a nozzle forming surface, (b) is a diagram illustrating of the nozzle forming surface partially enlarged, and (c) is a diagram illustrating an a result of ejecting coating from each nozzles.

FIG. 2(*a*) is a front view of a nozzle forming surface of the coating head 3. As shown therein, the nozzle forming surface 31 includes two nozzle groups 32*a*, 32*b* configured along a primary scanning direction in the coating head unit 24 (i.e., the S1 direction in FIG. 2(*a*)). As shown in FIG. 2(*b*), the nozzle group 32*a* is configured with a plurality of nozzle rows 34*a* configured in a secondary scanning direction (i.e., the S2 direction in FIG. 2(*a*) orthogonal to the primary scanning direction, where the nozzle row 34 is formed by, for example, four nozzles 33 spaced apart in a certain interval along a straight line L1 inclined at a predetermined angle relative to the primary scanning direction. Here, if the four nozzles forming the nozzle row 34 include a nozzle 33*a*, a nozzle 33*b*, a nozzle 33*c* and a nozzle 33*d* from the upper part in FIG. 2(*b*), the nozzles 33*a* of the each nozzle rows 34*a* are at the same locations. Likewise, nozzles 33*b*, nozzles 33*c*, and nozzles 33*d* in the each nozzle rows 34*a* are at the same locations in the primary scanning direction. Here, when the interval between two adjacent nozzles 33 in the same nozzle row 34*a* in the secondary scanning direction is set to D1, the interval D2 between two nozzles 33*a*, 33*d* adjacent to each other in the secondary scanning direction located at respective ends of two adjacent nozzle rows 34*a* is the same as the interval D1 (D1=D2).

Similarly, the nozzle group 32*b* includes a plurality of nozzle rows 32*b* in the secondary scanning direction, where the nozzle row 34*b* is formed by four nozzles 33 arranged in a straight line L2 inclined at a predetermined angle relative to the primary scanning direction. Here, the straight line L1 is parallel to the straight line L2. When the four nozzles in the nozzle row 34*b* are set as a nozzle 33*e*, a nozzle 33*f*, a nozzle 33*g*, and a nozzle 33*h* from the upper part in FIG. 2(*a*), the nozzles 33*e* in the each nozzle rows 34*b* are at the same locations in the primary scanning direction. Likewise, nozzles 33*f*, nozzles 33*g* and nozzles 33*h* in the each nozzle rows 34*b* are at the same locations in the primary scanning direction. It is worth noting that, although not shown in the figure, an interval D3 between two adjacent nozzles 33 in the same nozzle row 34*b* in the secondary scanning direction, and an interval D4 between two nozzles 33*e*, 33*h* adjacent to each other in the second scanning direction located at respective ends of two adjacent nozzle rows 34*b* are identical to the interval D1 (D3=D4=D1).

In addition, among the nozzle groups 32*a*, 32*b*, each nozzle rows 34*b* in the nozzle group 32*b* is disposed in the secondary scanning direction at locations offset a distance D1/2 from the respective arrays 34*a* in the nozzle group 34*a*.

Therefore, as shown in FIG. 2(*c*), if each nozzles 33 disposed on the nozzle forming surface 31 are projected onto the same projection plane PL1, the nozzle 33*a* in the nozzle row 34*a* is disposed between the nozzle 33*e* and the nozzle 33*f* in the nozzle row 34*b*. In addition, the nozzle 33*b* of the nozzle row 34*a* is disposed between the nozzle 33*f* and the nozzle 33*g* in the nozzle row 34*b*. Besides, the nozzle 33*c* of the nozzle row 34*a* is disposed between the nozzle 33*g* and the nozzle 33*h* of the nozzle row 34*b*. As such, two nozzle groups 32*a*, 32*b* formed on the nozzle forming surface 31 are used during coating to increase the point density.

Returning to FIG. 1, the image processing device 12 generates, based on CAD data corresponding to a coating range of a vehicle, a 3-dimensional model (a 3-dimensional model for coating) of measurement data obtained by measuring a real vehicle. In addition, the image processing device 12 generates, based on trajectory data stored in an arm memory 57 (see FIG. 5) and the generated 3-dimensional model for coating, 2-dimensional image data (coating pattern data) used when the coating head unit 24 is performing coating. The coating pattern data is data obtained by dividing a coating region in a vehicle body FR, and sends the same sequentially to the coating robot 11 when the vehicle body FR is being coated.

The transport device 13 conveys the sample S coated with a test pattern by the coating robot 11 from the coating chamber 17 to the inspection chamber 18. the transport device 13 is, for example, a conveyor device.

The coating determining device 14 captures the test pattern TP coated over the sample S, and determines, based on the captured camera data and image data for determination, whether coating by the coating head unit 24 is normally performed, i.e., whether coating defect occurs.

The coating determining device includes a camera section 41, a light source 42 and a computer 43. The camera section 41 captures a coated surface of the sample S transported by the transport device 13. The light source 42 illuminates the coated surface of the sample S transported by the transport device 13. The computer 43 controls driving of the camera section 41 and the light source 42. In addition, the computer 43 determines whether coating defect occurs based on the camera data acquired by the camera section 41 and image data used for determination. Alternatively, the computer 43 determines whether coating defect occurs based on the camera data acquired by the camera section 41 and baseline information (e.g. for value threshold of a linear pixel for determining, a width of a linear portion, and the like) other than the image data for determining coating defect. In the case of determining that coating defect occurs, the coating robot 11 is instructed to clean the coating head unit 24.

Figure 3:
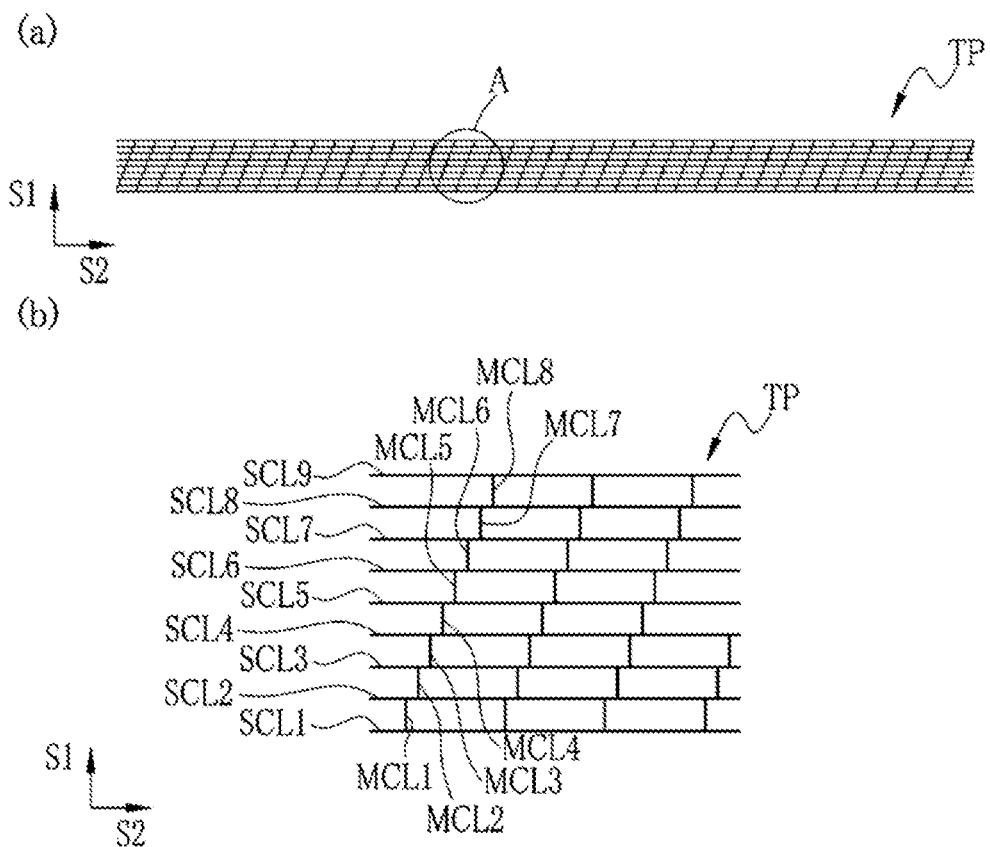
In FIG. 3, (a) is a diagram illustrating an example of a test pattern, and (b) is a diagram of an enlarged region A in (a).

Next, the test pattern TP is coated on the coated surface of the sample S. As shown in FIG. 3(a) and FIG. 3(b), the test pattern TP has a plurality of baselines MCL extending along the primary scanning direction (the S1 direction in FIG. 3) and a plurality of baselines SCL extending along the secondary scanning direction (the S2 direction in FIG. 3).

The baselines SCL extending along the secondary scanning line are generated by droplets of the paint ejected from the plurality of nozzles 33 of the coating head unit 24 disposed on the nozzle forming surface when the nozzles 33 reaching the specific locations in the primary scanning direction.

Figure 4:
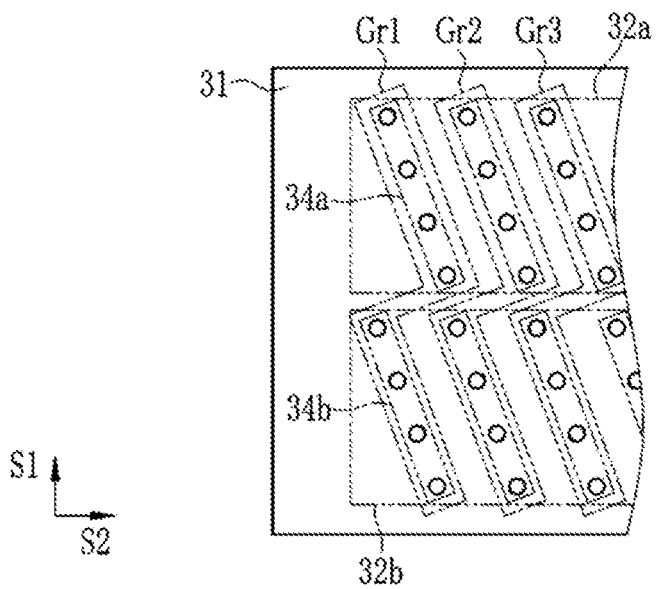
FIG. 4 is a diagram illustrating an example of division of nozzles disposed on a nozzle forming surface.

As shown in FIG. 4, the baselines MCL extending along the primary scanning direction are generated in such a fashion that: when the nozzles 33 ejecting the paint droplets are being switched, all the nozzles 33 belonging to the same group perform the following act: in the case that the nozzle row 34a from the nozzle group 32a and the nozzle row 34b from the nozzle group 32b in the same line counted from the left side in FIG. 4 in the secondary scanning direction (the S2 direction in FIG. 4) on the nozzle forming surface 33 are divided into the same group (Gr1, Gr2, Gr3 . . . ), when the coating head 30 is moving along the primary scanning direction, a certain nozzle from the nozzles in the same group continuously eject paint droplets multiple times (see below for which nozzle forms which baseline MCL). The number of baselines MCL and the baselines SCL are varied with the number of nozzles disposed on the nozzle forming surface 31.

As described above, the nozzle row 34a from the nozzle group 32a and the nozzle row 34b from the nozzle group 32b provide with four nozzles 33, respectively. Therefore, the test pattern TP as shown in FIG. 3(a) and FIG. 3(b) includes eight baselines MCL1-MCL8 extending along the primary scanning direction and 9 baselines SCL1-SCL9 extending along the secondary scanning direction, where the 8 baselines MCL1-MCL8 correspond to the number of groups divided in the secondary scanning direction.

In FIG. 3(b), the baseline MCL1 is a baseline formed by the paint continuously ejected from the nozzle 33e in the nozzle row 34b of the nozzle group 32b multiple times. The baseline MCL2 is a baseline formed by the paint ejected continuously from the nozzle 33a in the nozzle row 34a of the nozzle group 32a. The baseline MCL3 is a baseline formed by the paint continuously ejected from the nozzle 33f in the nozzle row 34b of the nozzle group 32b. The baselines MCL4 is a baseline formed by the paint continuously ejected from the nozzle 33b in the nozzle row 33a of the nozzle group 32a.

In addition, the baseline MCL5 is a baseline formed by the paint continuously ejected from the nozzle 33g in the nozzle row 34b of the nozzle group 32b. The baseline MCL6 is a baseline formed by the paint continuously ejected from the nozzle 33c in the nozzle row 34a of the nozzle group 32a. The baselines MCL7 is a baseline formed by the paint continuously ejected from the nozzle 33g in the nozzle row 34b of the nozzle group 32b. The baseline MCL8 is a baseline formed by the paint continuously ejected from the nozzle 33d in the nozzle row 34a of the nozzle group 32a.

It is to be noted that the test pattern TP determines the presence or absence of clogging of the plurality of nozzles 33 disposed on the nozzle forming surface 31. Accordingly, the baselines SCL extending along the secondary scanning direction are not necessary, and the test pattern TP may be a test pattern only having baselines MCL extending along the primary scanning direction.

Control composition in the coating system 10 according to the present implementation will be described below. FIG. 5 is a diagram illustrating control composition in the coating system 10. As shown therein, the coating system 10 includes a management device 35 and a nozzle cleaning device 36, in addition to the coating robot 11, the image processing device 12, the transport device 13 and the coating determining device 14.

The coating robot 11 includes a primary control section 51, an arm control section 52, a paint supply control section 53 and a head control section 54. Although not shown, the primary control section 51, the arm control section 52, the paint supply control section 53 and the head control section 54 are comprised of a CPU (Central Processing unit), a storage portion (ROM (Read Only Memory)), a RAM (Random Access Memory), a nonvolatile memory or the like, and other elements.

The primary control section 51 sends a predetermined control signal to the arm control section 52, the paint supply control section 53 and the head control section 54, respectively, to cause the motors M1, M2, M3, M4, M5 and M6, the paint supply section 58 and the piezoelectric substrate 60 to act in cooperation to perform coating on the object to be coated.

The arm control section 52 controls driving of the motors M1, M2, M3, M4, M5 and M6. The arm control section 52 includes an arm memory 57. The arm memory 57 stores data (trajectory data) related to trajectories of the coating head unit 24 created from a robot view and taking into consideration a width (referred to as coating width below) coated on the object to be coated in the primary scanning direction when the coating head unit 24 is caused to move along the primary scanning direction, and data (posture data) related to postures of the coating head unit 24, such as an inclined angle of the coating head unit 24 and the like.

In addition, the arm control section 52 controls driving of the motors M1, M2, M3, M4, M5 and M6 based on the trajectory data and posture data stored in the memory 57 and the image processing performed by the image processing device 12. As an effect of control of the motors M1, M2, M3, M4, M5 and M6, the coating head unit 24 can pass the target position at a determined speed or stop at the target position when performing coating. It would be appreciated that the arm memory 57 can be disposed on the coating robot 11, or can be disposed outside the coating robot 11. When disposed outside the coating robot 11, the arm memory 57 is preferably connected to a communication unit, where the communication unit can communicate with an external machine in a wireless or cabled fashion.

The paint supply control section 53 controls the supply of paint to the coating head 30. Although not shown in the drawings, the paint supply control section 53 controls actions of a pump, a valve and the like included in the paint supply section 58, so as to cause the paint stored in the paint tank, box and the like connected to the paint supply section 58 to circulate between the paint supply section 58 and the coating head unit 24.

The head control section 54 controls the action of the piezoelectric substrate 60 of the coating head 30 based on the data generated during image processing performed in the image processing device 12, and position information from a position sensor 61 described below. In other words, when determining, based on the position information from the position sensor 61, that the coating head 30 arrives at the predetermined position in the trajectory data, the head control section 54 causes the piezoelectric substrate 60 to act, based on coating data corresponding to the position. Here, the head control section 54 cannot only control the action of the piezoelectric substrate 60, but can also control an amount of droplets respectively ejected from the plurality of nozzles 33 disposed on the nozzle forming surface 31.

The position sensor 61 detects the position of the coating head 30 that moves under the control of the arm control unit 52, and outputs a detection signal to the primary control section 51.

The transport device 13 includes a drive control unit 65, a motor M7 and a drive roller 66. The drive control unit 65 drives the motor M7 based on a drive signal sent from the coating robot 11, to rotate the drive roller 66. The drive roller 66 is driven by the motor M7 to rotate, thus causing a coiled conveyor belt 68 across the drive roller 66 and a driven roller 67 (see FIG. 1) to move such that a sample S carried on the conveyor belt 68 is transported from the coating chamber 17 to the inspection chamber 18 (the arrow direction in FIG. 1).

Moreover, as described with reference to FIG. 1, the coating determining device 14 includes a camera section 41, a light source 42 and a computer 43. The computer 43 includes a control unit 71, an operation unit 72 and a display panel 73. The control unit 71 includes a primary control section 75, a camera control section 76, a light-emitting control unit 77 and a display control unit 78. By executing a determining program 80 stored in the memory 79 included in the control unit 71, the primary control section 75 can implement respective functions of an image processing section 84, an extraction section 85 and a determining unit 86.

The image processing section 84 performs image processing, such as scaling processing and the like, in addition to processing including denoising, destraining, brightness adjustment, and the like, performed on image data (hereinafter referred to as camera data) of the test pattern TP captured by the camera section 41, and contour extraction processing. In addition, as required, the image processing section 84 can perform binarization processing on the camera data. It is worth noting that the scaling processing refers to scaling up/down a size of a test pattern TP in an image based on camera data, to match the size of the test pattern TP in the image based on determination image data 81.

Using the determination image data 81 stored in the memory 79 and camera data (hereinafter referred to as processed data) obtained by image processing performed by the image processing section 84, the extraction section 85 extracts uncoated baselines MCL (missed from the coating) included in the test pattern TP. In the processed data, the coated baselines MCL are presented in the form of contour while the uncoated baselines MCL are not presented in this form. Therefore, when comparing the plurality of baselines MCL included in the determination image data 81 with a plurality of contours included in the processed data, the extraction section 85 extracts uncoated baselines MCL.

It is to be noted that the extraction section 85 can obtain the difference data between the processed data and the determination image data 81, and if the difference data within the range of coating the test pattern TP include a predetermined amount of pixels with pixel values exceeding a predetermined range in the primary scanning direction, the baselines MCL of the respective part are extracted as uncoated baselines MCL.

When none of a plurality of nozzles 33 disposed on the nozzle forming surface 31, for example, is clogged (i.e., in a normal state), all of the baselines MSL in the test pattern TP coated on the sample S are coated. The determination image data 81 are data acquired by coating all the baselines in the test pattern TP. As such, since the processed data include contours of respective baselines MCL for forming the test pattern TP, the uncoated baselines MCL are not extracted.

On the other hand, if the one of the plurality of nozzles 33 disposed on the nozzle forming surface 31, for example, is clogged, the baselines MCL corresponding to the nozzle 33 are not coated.

Therefore, the processed data do not include contours of the baselines MCL corresponding to the nozzle 33 among the baselines MCL forming the test pattern TP. In the case, the uncoated baselines MCL are extracted.

The extraction section 85 extracts the uncoated baselines MCL using the determination image data 81 and the processed data, and generates extraction data indicative of an extraction result. For example, when the uncoated baselines MCL are extracted, the extraction data include position information of the uncoated baselines MCL.

The determining section 86 determines whether coating defect occurs by using the extraction data generated by the extraction section 85. Coating defect will be described below. The determining unit 85 sends to the management device 35 a determination result as to whether coating defect occurs.

The management device 35 includes a CPU, a memory, and the like, which are not shown in the figure, and performs comprehensive control on the coating robot 11, the image processing device 12, the transport device 13 and the coating determining device 14 which jointly form the coating system 10. The management device 35 sends, based on the determination result as to whether coating defect occurs, a signal indicative of performing cleaning to the coating robot 11 and a nozzle cleaning device 36.

The nozzle cleaning device 36 is a device for cleaning the nozzle forming surface 31 of the coating head 30.

Coating defect is now described. For example, the coating defect refer to that more than 3 baselines MCL are not coated among baselines MCL1-MCL8 generated by the paint ejected from the nozzles divided into the same group Gr1, Gr2 . . . as shown in FIG. 4. Coating defect will be illustrated below.

(1) A State of Continuously Extracting More than 3 Uncoated Baselines MCL

Figure 6:
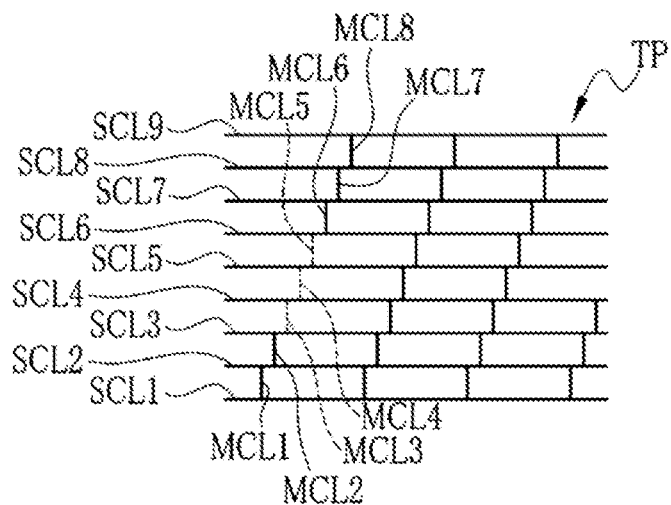
FIG. 6 is a diagram illustrating an example of a test pattern serving as a coating defect.

As shown in FIG. 3(b), for example, when each nozzles 33 in the same group normally eject the paint, all the baselines MCL1-MCL8 are coated. On the other hand, if the one in a plurality of nozzles 33 in the same group is clogged, a baseline MCL corresponding to the clogged nozzle 33 is not coated. In FIG. 6, for example, MCL3, MCL4 and MCL5 are not clogged which are denoted by dotted lines. As shown in FIG. 2(c), the nozzle 33b, nozzle 33f and nozzle 33g are adjacent nozzles 33 when projected onto the same projection plane PL1. If a vehicle body FR is coated in the state, the coated vehicle body FR includes a strip region not coated with the paint.

Figure 7:
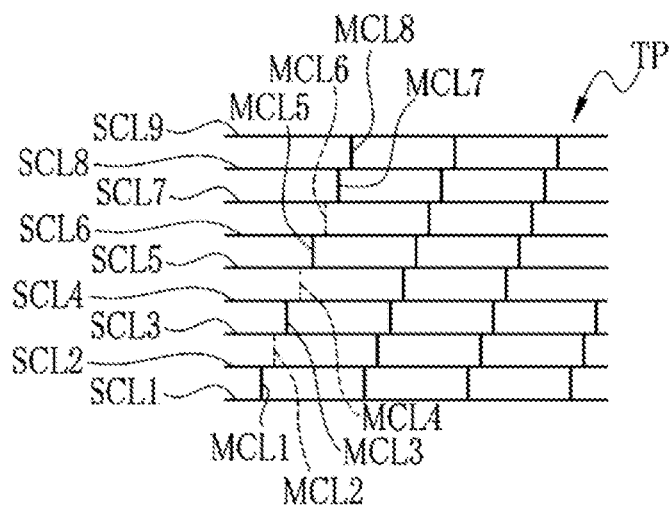
FIG. 7 is a diagram illustrating an example of a test pattern serving as a coating defect.

(2) A Condition of Extracting More than 3 Uncoated Baselines in Every Other Column As shown in FIG. 7, when the baseline MCL2, the baseline MCL4 and the baseline MCL6 are not coated, the nozzle 33a corresponding to the baselines MCL2, the nozzle 33b corresponding to the baseline MCL4 and the nozzle 33c corresponding to the MCL6 are clogged. In FIG. 7, the uncoated baselines MCL2, MCL4 and MCL6 are denoted in dotted lines. As shown in FIG. 2(c), the nozzle 33a, the nozzle 33b and the nozzle 33c are arranged every other nozzle when projected onto the same projection plane PL1. If a vehicle body FR is coated in the state, the uncoated parts and the coated parts are formed alternately, making the coated vehicle body FR look like discolored or seemingly have recesses.

Figure 8:
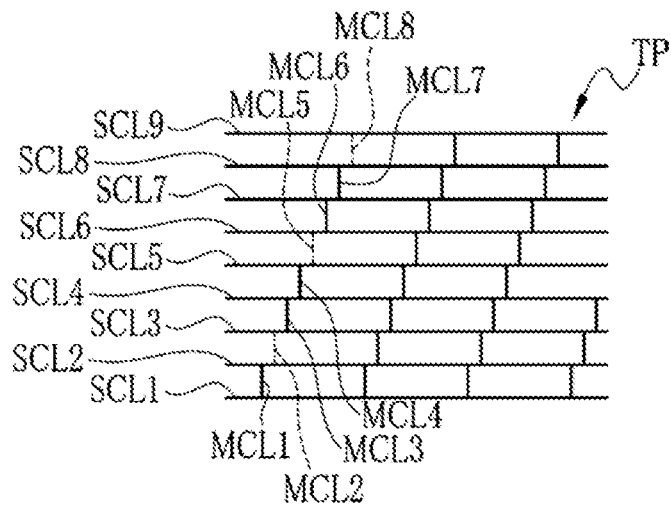
FIG. 8 is a diagram illustrating an example of a test pattern serving as a coating defect.

In addition, as shown in FIG. 8, for example, when the baseline MCL2, the baseline MCL5 and the baseline MCL8 are not coated, the nozzle 33a corresponding to the baseline MCL2, the nozzle 33g corresponding to the baseline MCL5, and the nozzle 33d corresponding to the baseline MCL8 are clogged. In FIG. 8, the uncoated baselines MCL2, MCL5 and the MCL8 are denoted by dotted lines. As shown in FIG. 2(c), the nozzle 33a, the nozzle 33d and the nozzle 33g are arranged every two nozzles when projected onto the same projection plane PL1. If a vehicle body FL is coated in the state, the coated vehicle body FR looks discolored due to the uncoated parts.

Figure 9:
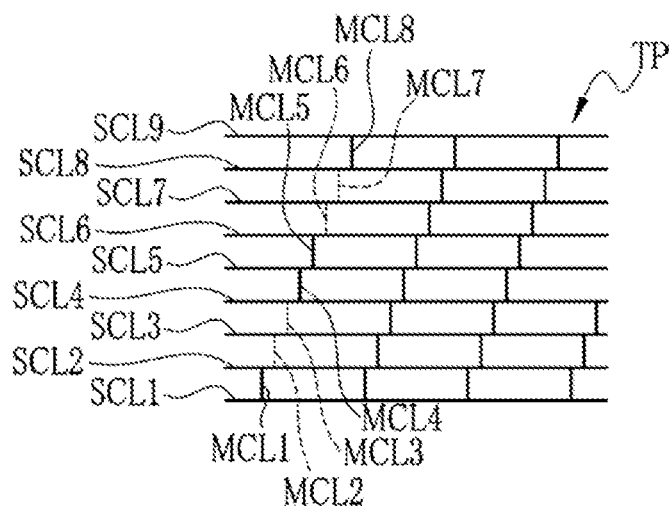
FIG. 9 is a diagram illustrating an example of a test pattern serving as a coating defect.

(3) A Condition where a Plurality of Uncoated Baselines are Continuous and a Plurality of Uncoated Parts are Extracted As shown in FIG. 9, for example, when the baseline MCL2, the baseline MCL3, the baseline MCL6 and the baseline MCL7 are not coated, the nozzle 33a corresponding to the baseline MCL2, the nozzle 33f corresponding to the baseline MCL3, the nozzle 33c corresponding to the baseline MCL6 and the nozzle 33h corresponding to the baseline MCL7 are clogged. In FIG. 9, the uncoated baselines MCL2, MCL3, MCL6 and MCL7 are shown in dotted lines. As shown in FIG. 2(c), the nozzle 33a, the nozzle 33a and the nozzle 33f, and the nozzle 33c and the nozzle 33h are adjacent to each other, respectively, when projected onto the same projection plane PL1. If the sample S is coated in the state, the coated vehicle body FR includes strip regions uncoated with the paint.

Here, even if it is indicated that nozzles 33 from, for example, the group Gr1 (or G2, G3, . . . ) eject droplets, coating defect is also determined when there are more than 3 uncoated baselines due to clogging. However, considering a number of nozzles 33 in each group, constituents of the paint for coating, paint colors, and the like, a number of uncoated baselines upon determination of the coating defect can be determined.

Figure 10:
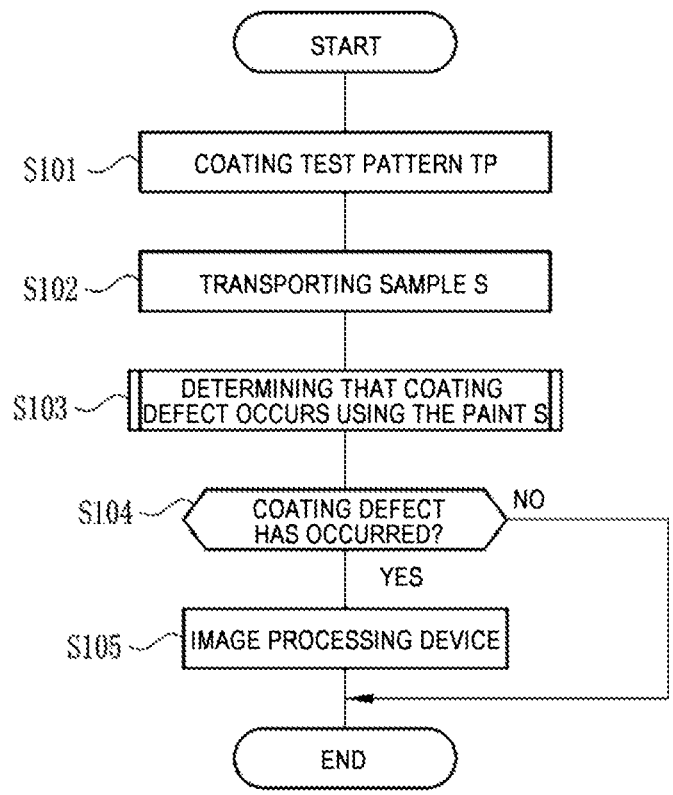
FIG. 10 is a flowchart illustrating a process from coating a test pattern to cleaning of a coating head unit.

Reference below will be made to the flowchart of FIG. 10 to describe a processing flow from coating, by the coating system, the test pattern TP to cleaning the coating head unit 24. The flowchart of FIG. 10 is performed, for example, in a case where a predetermined number of vehicles FR are coating by the painting robot 11 immediately before the coating is started on the vehicle body FR, or a case where a certain period of time has elapsed after the coating robot 11 is installed in the coating chamber 17.

Step S101: Coating the Test Pattern TP

The management device 35 instructs the image processing device 12 and the coating robot 11 to coat the test pattern TP. In response to receiving the instruction of coating the test pattern TP from the management device 35, the image processing device 12 generates coating pattern data based on the test pattern TP and sends the same to the coating robot 11. When the coating pattern data is received, the primary control section 51 of the coating robot 11 instructs the arm control section 52 and the head control section 54 to start driving. Upon receiving the instruction, the arm control section 52 reads, from the arm memory 57, trajectory data when the test pattern TP is coated, and performs drive control for respective motors M1-M6 based on the read trajectory data. The head control section 54 causes, based on the coating pattern data, the piezoelectric substrate 60 of the coating head unit 24 to act. In this way, the coating robot 11 is used to coat the test pattern TP on the sample S.

Step S102: Transporting the Sample S

If the coating robot 11 is used to coat the test pattern TP on the sample S, a content of coating completion is transmitted from the coating robot 11 to the management device 35. Upon receiving the content, the management device 35 instructs the transport device 13 to transport the sample S. The drive control unit 65 of the transport device 13 stops the drive of the motor M7 after the motor M7 has been driven for a predetermined time. The predetermined time is a time during which a transport time for transporting a sample S carried on the conveyor belt 68 to the inspection chamber 18.

Step S103: Determining Coating Defect

The primary control section 75 of the control unit 71 included in the coating determining device 14 determines whether coating defect occurs using the determination image data stored in the memory 79 and the camera data. Coating defect determination will be described below. The primary section 75 of the control unit 71 transmits the determination result of the coating defect to the management device 35.

When the management step device 35 determines that coating defect occurs at step S104, the method proceeds to Step S105. On the other hand, when it is determined that no coating defect has occurred, the flow as illustrated in FIG. 10 is completed.

Step 105: Cleaning the Coating Head

The management device 35 instructs the nozzle cleaning device 36 and the coating robot 11 to start nozzle cleaning. Upon receiving the instruction, the primary control section 51 of the coating robot 11 drives the ratable arm 26 and the first and second rotatable arms 27, 28 such that the position sensor 61 senses the position of the coating head unit 24 while the coating head unit 24 is moved to the cleaning position. Moreover, when the coating head unit 24 is moved to the cleaning position, the nozzle cleaning device 36 cleans the nozzle forming surface 31 of the coating head 30. As a result, the clogging is cleared.

It is not be noted that, at step S105, a new coating head unit 24 is substituted, rather than cleaning the nozzle forming surface 31 of the coating head 30. When a new coating head unit 24 is substituted, the old coating head unit 24 can be cleaned at other cleaning site.

Figure 11:
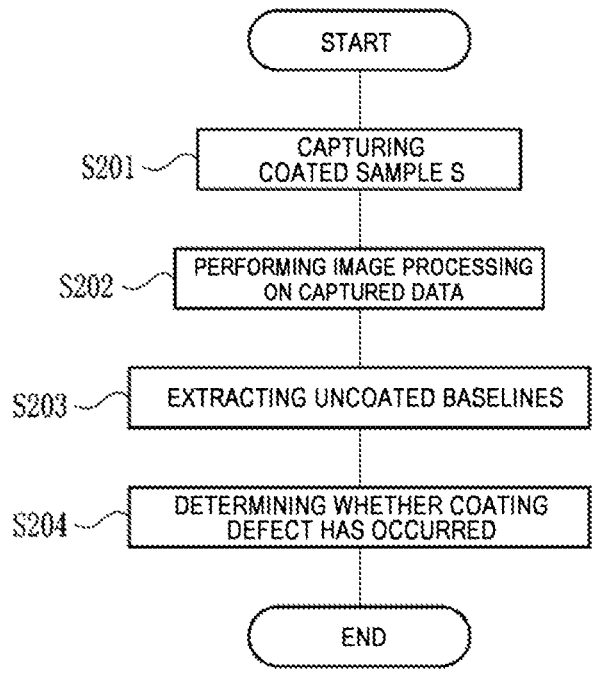
FIG. 11 is a flowchart illustrating a process of determining coating defect implemented according to the flowchart as shown in FIG. 10.

Reference now will be made to the flowchart of FIG. 11 to describe a process of determining coating defect at step S103. The process of determining coating defect at step S103 is performed by the computer 43 of the coating determining device 14.

Step S201: Capturing the Sample S.

The management device 35 instructs the coating determining device 14 to use the coating determination on the sample S. Upon receiving the instruction, the primary control section 75 of the control unit 71 instructs the camera control section 76 to capture pictures. At the same time, the light emitting control section 77 of the primary control section 75 instructs the light source 42 to emit light. Upon receiving the instruction, the light emitting control section 77 turns on the light source 42. In this way, the sample S coated with the test pattern is illuminated. In addition, the camera control section 76 drives the camera section 41 to capture the sample S illuminated by the light source 42. The camera data captured by the camera section 41 are output to the primary control section 75 of the control unit 71.

Step S202: Performing Image Processing on the Camera Data

The image processing section 84 of the primary control unit 75 performs, for the camera data, processing such as denoising, destraining, brightness adjustment and the like, as well as image processing such as contour extraction processing and the like, and generates processed data.

Step S203: Extracting Uncoated Baselines MCL

The extraction section 85 of the primary control section 75 reads the determination image data 81 stored in the memory 79. Besides, when referring to the read determination image data 81, the extraction section 85 of the primary control section 75 extracts the baselines MCL based on the processed data generated at step S202. The extraction section 85 of the primary control section 75 generates extraction data indicative of an extraction result.

Step S204: Determining Whether Coating Defect has Occurred

The determination section 86 of the primary control section 75 determines, based on the extraction data generated through the processing at step S203, whether uncoated baselines MCL exist for each group as mentioned above. When there is at least one group including, for example, more than 3 uncoated baselines MCL, it is determined that coating defect occurs. The number of groups including, for example, more than 3 uncoated baselines MCL, can be set appropriately. In the case, at step S105 as described above, the nozzle forming surface 31 of the coating head is cleaned.

Therefore, by capturing the coated surface of the sample S coated with the test pattern TP and comparing the same with a image for determination, it is possible to determine whether coating defect has occurred. In addition to this, by determining coating states of the baselines MCL, the positions of the clogged nozzles 33 can be determined.

In the above implementation, whether coating defect occurs can be determined based on absence or presence of the baseline MCL on the coated surface of the sample S. For example, a 3-dimensional displacement sensor is used to detect the coating state on the coated surface of the sample S such as a width of the baseline MCL, a splash state of the paint, a thickness of the baseline MCL (i.e., the film thickness of the paint) and the like, and determine the clogged state of the nozzle 33 based on the detected result.

Determining whether coating defect has occurred according to the above implementation is performed, for example, either when the coating robot 11 is used to coat a predetermined number of vehicle bodies FR prior to the commence of coating the vehicle body FR, or in a predetermined time after the coating robot 11 is disposed within the coating chamber 17. Alternatively, the determining whether coating defect is performed based on the coating state of the coated surface of the object to be coated. This will be described with reference to FIG. 12.

Figure 12:
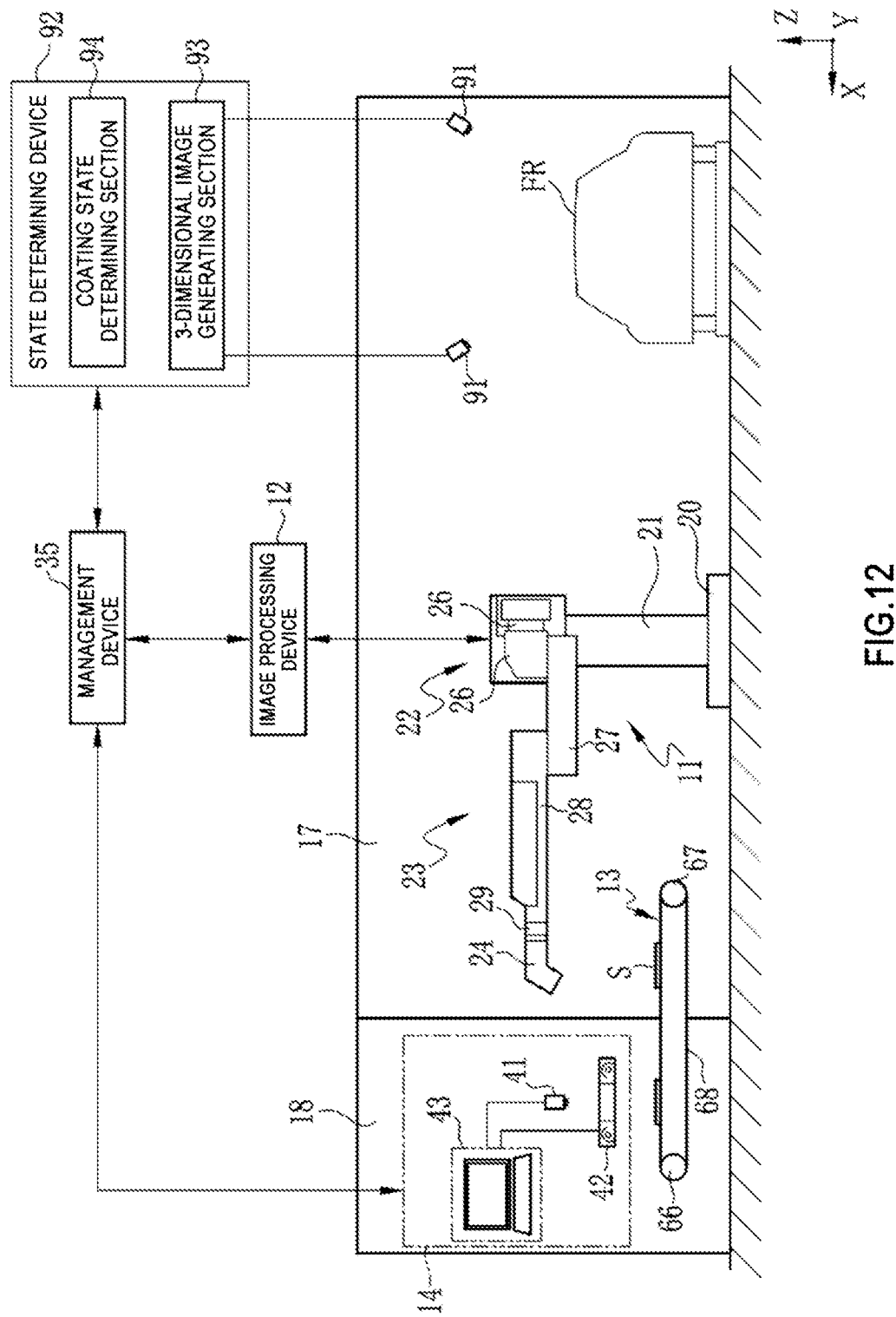
FIG. 12 is a diagram illustrating an example of a coating system performing coating defect determination based on a coating state of a coated surface.

As shown in FIG. 12, a plurality of camera sections 91 for capturing the coated vehicle body FR at different positions are disposed in the coating chamber 17. Those camera units 91 are connected to the state determining device 92, and controlled and driven by the latter. The plurality of camera sections 91 are disposed at a plurality of different positions, which can be fixed or movable.

The state determining device 92 generates, based on the camera data acquired by the plurality of camera sections 91, a 3 dimensional image of the coated surface of the vehicle body FR, and determines a state of the coated surface of the vehicle body FR. The state determining device 92 includes a 3-dimensional image generating section 93 and a coated state determining section 94. The coated state determining state 94 herein is equivalent to the state determining unit according to the technical solution.

The 3-dimensional image generating section 93 generates, based on the camera data acquired by the plurality of camera sections 91 and position data of the camera sections 91 when acquiring the camera data, 3-dimensional image data on the coated surface of the vehicle body FR.

The coated state determining section 94 computes a thickness of a coating film coated over the vehicle body FR using the 3-dimensional image data generated by the 3-dimensional image generating section 93 and 3-dimensional data of the vehicle body FR. If there is a part having a coating film with a thickness below a predetermined value, the coating determining device 14 is used to determine the coating state.

In the case, upon receiving a content of completion of, for example, the coating performed by the coating robot 11 for the vehicle body FR, the state determining device 92 drives the camera sections 91 to capture the vehicle body FR. In addition, the state determining device 92 generates the 3-dimensional data of the vehicle body FR acquired from the camera sections 91. If there are multiple parts, for example, having coating films each with a thickness below the predetermined value when using the 3-dimensional data of the vehicle body FR, the state determining device 92 instructs the management device 35 to coat the test pattern TP. Upon receiving the instruction, the management device 35 stops coating of the vehicle body FR and instructs to coat the sample S. Therefore, the management device 35 functions as an instruction unit according to the technical solution.

In this way, when it is determined that an uneven coating is performed in the coating state where the vehicle body FR is coated, it is instructed to coat the test pattern TP on the sample S. As such, the time when the line coating is stopped is minimized as much as possible, so as to maintain the efficiency for the vehicle body FR.

In the implementation described above, the uncoated baselines MCL are extracted using the determination image data 81 and the camera data acquired through image processing. However, the paint is ejected from the nozzle 33 based on the clogged state of the nozzle 33. At this time, the amount of droplets is less than the amount of droplets of the paint ejected from the nozzle when there is no clogging, and the baseline MCL becomes thinner. In addition, in a condition that the nozzle 33 is clogged, the continuity of the droplets of the paint adhering to the coated surface is abnormal. In the process of determining whether there is clogging, the width of the coated width and continuity of the paint droplets adhered to the coated surface may be taken into consideration. If those are taken into consideration, not only the presence or absence of lockage in the nozzle corresponding baseline MCL can be determined, a degree of clogging in the nozzle can also be derived.

For example, if a baseline becomes thin or curved, it is determined that the corresponding nozzle is in a semi-clogged state. At this time, the nozzle 33 determined in a semi-clogged state can be set not to perform the following coating.

It would be appreciated that, if there is a nozzle determined not to perform the following coating, nozzles at the peripheral part of the nozzle can be used for imputation in the following coating.

In the present implementation, the coating determining device 14 is the coating determining device 14 of the coating head unit 24. The coating head unit 24 includes a plurality of nozzles 33 for ejecting paints, which eject paints therefrom when moving in a direction. The ejected paints are used to coat the sample S. The coating determining device 14 includes a camera section 41 for acquiring an image of the coated sample S, and a determination section 86 for determining, based on the image acquired by the camera unit 41, whether coating the sample S is normally performed.

As such, it cannot only be determined, based on the image of the coated sample S, whether the sample S is normally coated, but respective states (presence or absence of clogged pores, a clogging degree of a pore and the like) of the plurality of nozzles 33 included in the coating head unit 24 can also be obtained. In addition, a reliable detection on whether the sample S can be normally coated can be performed in a short time. When the respective states of the plurality of nozzles 34 of the coating head unit 24 are obtained, the coating quality for the vehicle body FR can be improved.

Besides, there is provided an extraction section 85 for extracting, from the image of the coated sample S, coating defect performed for the sample S. When the extraction section 85 extracts coating defect in the sample, the determination section 86 determines the nozzles in the plurality of nozzles 33 included in the coating head unit 24 having an ejecting defect for the paint.

Coating missing, namely no paint coating performed, or position offsets of the ejected paints can be determined, making it easy to determine the positions of the nozzles 33 in the plurality of nozzles 33 included in the coating head unit 24 having an ejecting defect for the paint.

The coating head unit 24 includes a head control section 54 for controlling paint ejection at the plurality of nozzles 33 for each nozzle, which cooperates with the coating head unit 24 to move in a direction. The plurality of nozzles 33 included in the coating head unit 24 are used to apply, to the sample S, the test pattern TP for determining whether paint ejection failure occurs, and the determination section 86 determines, based on the image of the sample S coated with the test pattern TP, whether coating the sample S is implemented normally.

Whether the coating of the coating head unit 24 is performed normally is determined using, for example, the image of the coated test pattern TP. Since the test pattern TP is used to determine whether the nozzles 33 are clogged, the clogged states of the plurality of nozzles 33 can be reliably detected (obtained).

The coating head unit 24 is provided with a plurality of nozzle rows 34a, 34b in a direction orthogonal to a direction, where the nozzle rows 34a, 34b include a predetermined number of nozzles 33 arranged in an inclined direction relative to the direction. The test pattern TP at least includes a plurality of baselines MCL configured in a 2-dimensional shape and arranged along a direction. When the coating head 30 moves in a direction, the head control section 54, while switching the nozzles, causes all the nozzles 33 to respectively perform such an action that a certain nozzle in the predetermined number of nozzles 33 respectively included in the plurality of nozzle rows 34a, 34b ejects the paint continuously to coat the sample S with a plurality of baselines MCL.

In the present disclosure, while the coating head unit 24 is moving in a direction, the paint is ejected from the each nozzle 33 to coat a workpiece as the object to be coated. A plurality of coating heads 30 of the plurality of nozzle rows 34a, 34b disposed in a direction orthogonal to the direction are used, where the nozzle rows 34a, 34b respectively include a predetermined number of nozzles 33 arranged in a direction inclined relative to the movement direction of the coating head unit 24, and a plurality of baselines MCL respectively corresponding to the nozzles 33 of the coating head 30 are set as a test pattern TP. As such, by determining the coating state of each baseline MCL, it is easy to determine whether there is a nozzle 33 causing coating defect, and obtain the coated state of the vehicle body FR.

In the image of the test pattern TP acquired through the camera section 41, if coating defect is performed for a predetermined number of baselines MCL in the baselines MCL formed by a certain nozzle in a predetermined number of nozzles 33 included in the same nozzle row 34a, 34b, the determination section 86 determines that the sample S coated using the coating head 24 is not normally coated.

For example, the state where coating defect is performed for more than the predetermined number of baselines MCL is a state where the FR cannot be uniformly coated. The vehicle body FR in the coated state is considered as a coating failure and thus cannot be used. Therefore, by obtaining the coated state of the sample S coated using the coating head unit 24, it is possible to avoid poorly coated vehicle bodies FR.

In addition, there are further provided: at least one camera section 91 that captures the vehicle body VR at a plurality of different positions; a 3-dimensional image generating section 39 that generates, based on the image captured by the at least one camera section 91, a 3-dimensional image of the vehicle body FR coated by the coating head 30; and a coated state determining section 94 that determines the coated state of the vehicle body FR using the 3-dimensional image of the vehicle body FR generated by the 3-dimensional image generating section 93.

In this way, by acquiring the 3-dimensional image of the coated vehicle body FR, it is possible to obtain the coating state of the coated surface of the vehicle body FR, i.e., it is possible to determine whether uneven coating is carried out. For example, if uneven coating is carried out, the nozzle 33 corresponding to the uneven part among the plurality of nozzles 33 included in the coating head unit 24 can be determined. In addition, the clogged state of the pore of the each nozzle 33 can be determined based on the unevenness of the coating.

Moreover, the coated state determining section 94 further includes a management device 35 that determines, using the 3-dimensional image, whether the thickness of the paint coated over the sample S is below a predetermined thickness, and if determining that the thickness of the coating is below a predetermined thickness, the coted state determining section 94 instructs to coat the sample S with a test pattern TP for determining presence or absence of an ejecting defect for the paint.

As such, when the 3-dimensional image is coated unevenly on the coated surface of the vehicle body FR, it is instructed to coat the test pattern TP on the sample S, making it possible to appropriately detect the nozzle 33 among the plurality of nozzles 33 included in the coating head 30 having an ejecting defect for the paint caused by pore clogging and the like.

There are further provided: a coating head unit 24 including a plurality of nozzles 33; a coating robot 11 that is disposed within a coating chamber 17 subjected to an explosion-poof treatment and can cause the coating head unit 24 to move along the sample S in a direction; the coating determining device 14 described above; and a nozzle cleaning device 36 for cleaning a plurality of nozzles 33 included in the coating head 30, the nozzle cleaning device 36 cleaning the plurality of nozzles 33 included in the coating head 30 when the coating determining device 14 determines that the sample S is not normally coated.

Accordingly, when the coating determining device 14 determines that it is unable to normally coat the sample S, the plurality of nozzles included in the coating head 30 are cleaned to remove the clogging of the nozzle 33 and thus maintain the coating quality for the vehicle body FR.

At this time, a workpiece includes the sample S coated with a test pattern in the coating determining device 14 for determining whether the coating the vehicle body FR can be performed normally. The coating determining device 14 is disposed outside the coating chamber 17 and further includes a transport device 13 for transporting the sample S coated with a test pattern by the coating head unit 24 to the coating determining device 14.

In the process of coating the sample with the test pattern, when the sample S coated with the test pattern is transported to the coating determining section 14, the vehicle body FR to be coated subsequently is placed in a predetermined position. For example, during coating the vehicle body FR after it is placed, the coating determining device 14 determines whether normal coating is performed by the coating head unit 24 for the transported sample S. If the coating is not performed normally, the vehicle body FR will not be coated, and the coating head unit 24 is cleaned instead. In this way, a coated defect of the vehicle body FR can be avoided. In addition, when the coating determining device 14 is disposed outside the coating chamber 17, the coating chamber 17 forms a configuration only for coating the sample S or the vehicle body FR such that the cause of a fire can be excluded from the coating chamber 17.

I claim:

1. A coating determining device of a coating head for determining a coating state of the coating head, the coating head having a plurality of nozzles for ejecting paint and being configured to eject the paint out of the plurality of nozzles so as to coat a workpiece with the ejected paint while moving in a first direction, wherein the coating determining device comprises:

at least one camera unit for capturing an image of the workpiece;

an image acquiring unit configured to acquire one or more images of the workpiece and generate a 3-dimensional model of the workpiece,
wherein the image acquiring unit determines a coating pattern for coating the workpiece using the 3-dimensional model; and a determination unit configured to determine, based on the image acquired by the image acquiring unit, whether coating the workpiece is implemented normally;

wherein the coating head is provided with a plurality of nozzle rows in a second direction orthogonal to the first direction, the plurality of nozzle rows in the second direction each including a predetermined number of nozzles arranged in a third direction inclined relative to the second direction;

wherein the coating head comprises a control unit for controlling ejection of the paint at the plurality of nozzles for each nozzle;

wherein the control unit cooperates with the coating head to move in the first direction, and applies to the workpiece with a pattern for determining whether there is an ejecting defect for the paint using the plurality of nozzles comprised by the coating head;

wherein the image acquired by the image acquiring unit comprises an image of the workpiece coated with the pattern for determination; and wherein the pattern for determination comprises a plurality of baselines configured in a 2-dimensional shape and extending along the first direction;

wherein when the coating head is moving in the first direction, the control unit, while switching the nozzles, coats the plurality of baselines onto the workpiece by continuously ejecting paint baselines from any one of the predetermined number of nozzles comprised by each of the plurality of nozzle rows.

2. The coating determining device of the coating head of claim 1, further comprising:

an extraction unit for extracting a coating defect in the workpiece from the image of the workpiece coated with the pattern for determination, wherein when the extraction unit determines that the coating defect occurs in the workpiece, the determination unit determines nozzles in which an ejecting defect occurs from the plurality of nozzles comprised by the coating head.

3. The coating determining device of the coating head of claim 2, wherein:

the coating head comprises a control unit for controlling ejection of the paint at the plurality of nozzles for each nozzle, the control unit cooperates with the coating head to move in a first direction, and applies to the workpiece with a pattern for determining whether there is an ejecting defect for the paint using the plurality of nozzles comprised by the coating head, and the determination unit determines, based on an image of the workpiece coated with the pattern for determination, whether coating the workpiece is implemented normally.

4. The coating determining device of the coating head of claim 1, wherein:

in the image of the pattern for determination acquired by the image acquiring unit, for the baselines formed using any one from the predetermined number of nozzles comprised in a same nozzle row, when the coating defect occurs in more than a predetermined number of baselines, the determination unit determines that coating the workpiece is not implemented normally using the coating head.

5. The coating determining device of the coating head of claim 1, further comprising:
    a 3-dimensional image generating unit for generating, using the image acquired by the at least one camera unit, a 3-dimensional image of the workpiece coated by the coating head; and
    a state determining unit for determining, using the 3-dimensional image of the workpiece generated by the 3-dimensional image generating unit, a coated state of the workpiece;
    wherein the at least one camera unit is configured for capturing images of the workpiece at a plurality of different positions.

6. The coating determining device of the coating head of claim 4, further comprising:
    wherein the image acquiring unit comprises a 3-dimensional image generating unit for generating, using the image acquired by the at least one camera unit, a 3-dimensional image of the workpiece coated by the coating head; and
    a state determining unit for determining, using the 3-dimensional image of the workpiece generated by the 3-dimensional image generating unit, a coated state of the workpiece.

7. The coating determining device of the coating head of claim 6, further comprising:
    an instruction unit for instructing to apply the pattern for determining presence or absence of an ejecting defect for the paint when the state determining unit determines that a thickness of the paint is below a predetermined thickness, wherein the state determining unit determines, using the 3-dimensional image, whether the thickness of the paint coated over the workpiece is below the predetermined thickness.

8. The coating determining device of the coating head of claim 6, further comprising:
    an extraction unit for extracting a coating defect in the workpiece from the image of the coated workpiece,
    wherein when the extraction unit determines that the coating defect occurs in the workpiece, the determination unit determines the nozzles in which the ejecting defect occurs from the plurality of nozzles comprised by the coating head.

9. A coating system, comprising:
    a coating head comprising a plurality of nozzles;
    a moving unit disposed within a coating chamber subjected to an explosion-proof treatment and configured to move the coating head along a workpiece in a direction;
    the coating determining device of the coating head of claim 1; and
    a cleaning unit for cleaning the plurality of nozzles comprised by the coating head,
    wherein when the coating determining device of the coating head determines that coating the workpiece is not implemented normally, the cleaning unit cleans the plurality of nozzles comprised by the coating head.

10. The coating determining device of the coating head of claim 1, further comprising:
    wherein the image acquiring unit comprises a 3-dimensional image generating unit for generating, using the image acquired by the at least one camera unit, a 3-dimensional image of the workpiece coated by the coating head; and
    a state determining unit for determining, using the 3-dimensional image of the workpiece generated by the 3-dimensional image generating unit, a coated state of the workpiece.

11. The coating determining device of the coating head of claim 10, further comprising:
    an instruction unit for instructing to apply the pattern for determining presence or absence of an ejecting defect for the paint when the state determining unit determines that a thickness of the paint is below a predetermined thickness, wherein the state determining unit determines, using the 3-dimensional image, whether the thickness of the paint coated over the workpiece is below the predetermined thickness.

12. The coating determining device of the coating head of claim 10, further comprising:
    an extraction unit for extracting a coating defect in the workpiece from the image of the coated workpiece,
    wherein when the extraction unit determines that the coating defect occurs in the workpiece, the determination unit determines the nozzles in which the ejecting defect occurs from the plurality of nozzles comprised by the coating head.

13. A coating system, comprising:
    a coating head comprising a plurality of nozzles;
    a moving unit disposed within a coating chamber subjected to an explosion-proof treatment and configured to move the coating head along a workpiece in a direction;
    at least one camera unit for capturing an image of the workpiece;
    a coating determining device comprising:
        an image acquiring unit for acquiring one or more images of the workpiece and generate a 3-dimensional model of the workpiece,
            wherein the image acquiring unit determines a coating pattern for coating the workpiece using the 3-dimensional model,
        a determination unit for determining, based on the one or more images acquired by the image acquiring unit, whether coating the workpiece is implemented normally, and
        wherein the coating head comprises a control unit for controlling ejection of paint at the plurality of nozzles for each nozzle,
        wherein the control unit cooperates with the coating head to move in a first direction, and applies to the workpiece with a pattern for determining whether there is an ejecting defect for the paint using the plurality of nozzles comprised by the coating head, and
        wherein the determination unit determines, based on one or more images of the workpiece coated with the pattern for determination, whether coating the workpiece is implemented normally; and
    a cleaning unit for cleaning the plurality of nozzles comprised by the coating head,
    wherein when the coating determining device of the coating head determines that coating the workpiece is not implemented normally, the cleaning unit cleans the plurality of nozzles comprised by the coating head.

14. A coating system, comprising:
    a coating head comprising a plurality of nozzles;
    a moving unit disposed within a coating chamber subjected to an explosion-proof treatment and configured to move the coating head along a workpiece in a direction;

a coating determining device comprising:
- at least one camera unit for capturing an image of the workpiece,
- an image acquiring unit for acquiring one or more images of the workpiece and generate a 3-dimensional model of the workpiece,
  - wherein the image acquiring unit determines a coating pattern for coating the workpiece using the 3-dimensional model,
- a determination unit for determining, based on an image acquired by the image acquiring unit, whether coating the workpiece is implemented normally, and
- wherein the coating head comprises a control unit for controlling ejection of paint at the plurality of nozzles for each nozzle,
- wherein the control unit cooperates with the coating head to move in a first direction, and applies to the workpiece with a pattern for determining whether there is an ejecting defect for the paint using the plurality of nozzles comprised by the coating head,
- wherein the determination unit determines, based on an image of the workpiece coated with the pattern for determination, whether coating the workpiece is implemented normally,
- wherein the coating head is provided with a plurality of nozzle rows in a second direction orthogonal to the first direction, the nozzle rows each including a predetermined number of nozzles arranged in a third direction inclined relative to the second direction,
- wherein a pattern for determination comprises a plurality of baselines configured in a 2-dimensional shape and extending along the first direction, and
- wherein when the coating head is moving in the first direction, the control unit, while switching the nozzles, coats the plurality of baselines onto the workpiece by continuously ejecting paint baselines from any one of the predetermined number of nozzles comprised by each of the plurality of nozzle rows; and
- a cleaning unit for cleaning the plurality of nozzles comprised by the coating head,
- wherein when the coating determining device of the coating head determines that coating the workpiece is not implemented normally, the cleaning unit cleans the plurality of nozzles comprised by the coating head.

15. A coating system, comprising:
- a coating head comprising a plurality of nozzles;
- a moving unit disposed within a coating chamber subjected to an explosion-proof treatment and configured to move the coating head along a workpiece in a direction;
- at least one camera unit for capturing an image of the workpiece;
- a coating determining device comprising:
  - an image acquiring unit for acquiring the image of the workpiece and generate a 3-dimensional model of the workpiece,
    - wherein the image acquiring unit determines a coating pattern for coating the workpiece using the 3-dimensional model,
  - a determination unit for determining, based on the image acquired by the image acquiring unit, whether coating the workpiece is implemented normally, and
  - wherein the coating head comprises a control unit for controlling ejection of paint at the plurality of nozzles for each nozzle,
  - wherein the control unit cooperates with the coating head to move in a first direction, and applies to the workpiece with a pattern for determining whether there is an ejecting defect for the paint using the plurality of nozzles comprised by the coating head,
  - wherein the determination unit determines, based on an image of the workpiece coated with the pattern for determination, whether coating the workpiece is implemented normally,
  - wherein the coating head is provided with a plurality of nozzle rows in a second direction orthogonal to the first direction, the plurality of nozzle rows each including a predetermined number of nozzles arranged in a third direction inclined relative to the second direction,
  - wherein a pattern for determination comprises a plurality of baselines configured in a 2-dimensional shape and extending along the first direction,
  - wherein when the coating head is moving in the first direction, the control unit, while switching the nozzles, coats the plurality of baselines onto the workpiece by continuously ejecting paint baselines from any one of the predetermined number of nozzles comprised by each of the plurality of nozzle rows, and
  - wherein in the image of the pattern for determination acquired by the image acquiring unit, for the baselines formed using any one from the predetermined number of nozzles comprised in a same nozzle row, when the coating defect occurs in more than a predetermined number of baselines, the determination unit determines that coating the workpiece is not implemented normally using the coating head; and
- a cleaning unit for cleaning the plurality of nozzles comprised by the coating head,
- wherein when the coating determining device of the coating head determines that coating the workpiece is not implemented normally, the cleaning unit cleans the plurality of nozzles comprised by the coating head.

* * * * *